United States Patent [19]

Jacques et al.

[11] Patent Number: 4,741,835

[45] Date of Patent: May 3, 1988

[54] OIL-IN-WATER EMULSION BREAKING WITH HYDROPHOBICALLY FUNCTIONALIZED CATIONIC POLYMERS

[75] Inventors: Donald F. Jacques, Belle Mead; Jan Bock, Bridgewater; Paul L. Valint, Asbury, all of N.J.

[73] Assignee: Exxon Research and Engineering Company, Florham Park, N.J.

[21] Appl. No.: 904,418

[22] Filed: Sep. 8, 1986

[51] Int. Cl.$^4$ ............................................. C02F 1/56
[52] U.S. Cl. ..................... 210/708; 210/734; 252/344; 252/358
[58] Field of Search ............... 210/708, 725, 727, 728, 210/732–735; 252/340, 341, 344, 358

[56] References Cited

U.S. PATENT DOCUMENTS

| | | | |
|---|---|---|---|
| 3,147,218 | 9/1964 | Booth et al. | 210/734 |
| 3,691,086 | 9/1972 | Lees et al. | 252/341 |
| 3,716,483 | 2/1973 | Renner | 210/693 |
| 3,956,117 | 5/1976 | Bradley et al. | 210/708 |
| 4,026,794 | 5/1977 | Mauceri | 252/344 |
| 4,081,403 | 3/1978 | Takegami et al. | 210/192 |
| 4,160,742 | 7/1979 | Raman | 252/344 |
| 4,224,150 | 9/1980 | Buriks et al. | 210/735 |
| 4,304,902 | 12/1981 | Landoll | 528/419 |
| 4,343,730 | 8/1982 | Becker et al. | 210/734 |
| 4,395,524 | 7/1983 | Emmons et al. | 524/555 |
| 4,432,881 | 2/1984 | Evani | 524/375 |
| 4,472,284 | 9/1984 | Bolhofner | 210/708 |
| 4,520,182 | 5/1985 | Turner et al. | 526/307.2 |
| 4,528,348 | 7/1985 | Turner et al. | 526/303.1 |
| 4,529,782 | 7/1985 | Fan et al. | 526/259 |
| 4,588,508 | 5/1986 | Allenson et al. | 210/708 |

*Primary Examiner*—Peter Hruskoci
*Attorney, Agent, or Firm*—Richard E. Nanfeldt

[57] ABSTRACT

A method of breaking an oil-in-water emulsion which comprises the steps of treating said oil-in-water emulsion with at least a de-emulsifying amount of a water dispersible terpolymer formed by polymerization from an acrylamide monomer, a water soluble cationic monomer and a water insoluble, hydrophobic monomer, and separating the formed water phase from the formed phase of terpolymer and the oil.

5 Claims, No Drawings

OIL-IN-WATER EMULSION BREAKING WITH HYDROPHOBICALLY FUNCTIONALIZED CATIONIC POLYMERS

BACKGROUND OF THE INVENTION

1. Field of the Invention

The present invention teaches an improved process for clean-up of waste waters containing organic contaminants. In addition, the process is useful for breaking or resolving oil-in-water emulsions, such as those produced during oil recovery operations. Both the extent of clean-up based on residual oil left in the waste water and the efficiency of clean up based on the treat rate of additive have been found to be significantly improved employing the novel process of this invention. The novel process involves the use of a low level of a water dispersible terpolymer consisting of a water soluble nonionic monomer, such as acrylamide, a cationic monomer, such as 3-acrylamidopropyltrimethylammonium chloride, and a hydrophobic monomer, such as alkyl(meth)acrylamide or alkyl(meth)acrylate. These terpolymers are effective for the clean-up of waste waters containing organic contaminants and for the breaking of oil-in-water produced emulsions.

2. Description of the Prior Art

The production of waste water clean enough for safe disposal continues to be a problem, especially when oil is emulsified in the primary waste water. In oil production, especially where high levels of water flooding or steam flooding are being practiced, oil-in-water emulsions are generated. These water continuous emulsions are generally referred to as reverse emulsions since the more usual oil field produced fluid is a water-in-oil emulsion. Reverse emulsions are difficult to break and generally result in large volumes of oil contaminated waste water that must be treated for removal of oil and solids before disposal by either release to surface streams, injection or use as boiler water makeup for steam generation. Other oil-in-water emulsions of concern in the waste water treating area are those produced as a result of steel mill and metal working operations, food processing, refinery and chemical plant operation, cooling water blow-down, bitumen extraction from tar sands and shale oil operations, rain water run-off and a host of others. These emulsions all have in common the fact that the oil or organic phase is insoluble in the water continuous phase. The amount of oil dispersed in these water continuous emulsions varies from a few to several hundred parts per million in waste waters to several percent (5 to 25% or more) in fluids right out of the wellhead.

The oil is generally well dispersed in the water phase as very small droplets that are stabilized as a result of the presence of natural surfactants. The stability of these oil-in-water emulsions generally results from either a negative charge imparted to the droplets by these surfactants or from steric stabilization caused by surfactants, or by the shear which the fluid experiences during production, which causes the generation of smaller and more stable droplets, or from several other sources. As the density of the organic phase becomes higher, approaching that of the water phase, further stability is imparted to the emulsion. The presence of fine solids, such as clays, sands, corrosion products, etc., in the fluids add to the stability of these oil-in-water emulsions. The stability of these oil-in-water emulsions must be overcome if the oil is to be removed from the water before disposal or in order to separate the oil from the water in the produced fluids in the case of oil production in water floods and steam floods.

Current practice is to attempt to break waste water oil-in-water emulsions using various mechanical techniques, such as API separators, induced air flotation (IAF), dissolved air flotation (DAF), or other methods. In the API separator method time is allowed for the oil droplets to come together and float to the surface or to settle to the bottom if it is adsorbed on solids. In many cases just a large tank is used to provide a long holding time for a fluid under essentially low flow or quiescent conditions. The expectation is that the long residence time will permit coalescence and rising of the oil droplets. In the flotation methods air or another gas, such as natural gas or produced gases in the oil field where the waste water is generated, is used to form very small gas bubbles under the surface of the waste water which float to the surface. As the gas bubbles rise to the surface the oil droplets attach themselves and rise to the surface with them, concentrating at the surface wher the oil can be removed.

Various chemicals, surfactants and polymers are generally applied to these waters to enhance the separation of oil and water using the above methods and, in some cases, are required if the method is to work at all. These chemicals are used to aid in foam generation in flotation. In addition they may be used to cause oil droplet surface charge neutralization, which results in destabilization of the oil-in-water emulsion. This destabilization results in agglomeration of the oil droplets, floc formation, and possibly several other beneficial effects. While the use of such chemicals generally enhances the separation of oil from oil-in-water emulsions, there remains significant room for improvement. The type of water soluble polymers currently used are generally acrylamide copolymers or melamine/formaldehyde polymers, or others. For example, Bolhofner in U.S. Pat. No. 4,472,284 describes the treatment of water containing fats, oils and greases using a melamine-formaldehyde condensation product, along or in combination with a polyacrylamide. Rather high polymer concentrations are needed and a two polymer system can present handling difficulties during field operations. Another approach to the treatment of waste water involves the use of water insoluble polymeric adsorbents, as described by Renner in U.S. Pat. No. 3,716,483, or Takegani, et al. in U.S. Pat. No. 4,081,403. These processes for treating waste water are costly and cannot achieve the degree of cleanup of the present invention. Copolymers of acrylamide with various cationic monomers of various comonomer ratios have been used. Some of the cationic monomers that have been used are: methyacrylamidoalkyltrimethylammonium salts or similar acrylate esters, diallyl dialkyl ammonium salts, as described by Booth and Linke in U.S. Pat. No. 3,147,218, salts of dimethylaminoethylmethacrylate and the like. Buris, et al., U.S. Pat. No. 4,224,150, describe a process for clarifying aqueous systems employing quaternary ammonium adducts of polymerizable tertiary ammonium salts and acrylamide. These polymers are generally available as high molecular weight materials, either in aqueous solution, as emulsions of various types, or in solid form, which requires dissolution before use.

Typically, treatment polymers are mixed into the waste water using various levels of shear. The water is then allowed to stand in a quiescent state for several hours or days until the oil flocculates and floats to the surface, where it is skimmed off. The water phase containing any residual oil is removed from beneath the surface and is either further treated, reused or is disposed of. As an alternative to the above quiescent aging method, the polymer-treated water can be sent to a gas flotation device for oil removal as described above.

Reverse emulsions produced in the wellhead in steam floods or in water floods are generally treated with surfactants and polymers in a similar way. However, flotation equipment is not generally used on the wellhead fluid, but is used on the water, which we have called waste water, broken out of the produced emulsion. A more typical practice would be the use of settling tanks, which hold the produced fluid in a quiescent state at elevated temperature for a period of time. This equipment may vary from a simple tank to devices which add heat and make use of electrical fields to accelerate the breaking of emulsions.

Improved methods for resolving oil-in-water emulsions, such as those produced at the wellhead, would find significant utility and environmental benefit. For example, if the level of residual oil remaining in the treated water could be reduced or the speed of oil removal increased, then a more economical treating operation would result. These improvements in treating method would provide both an economic and environmental benefit. The present invention describes an improved process for treating oil-in-water emulsions.

SUMMARY OF THE INVENTION

The present invention teaches an improved process for clean-up of waste waters containing organic contaminants. In addition, the process is useful for breaking or resolving oil-in-water emulsions, such as those produced during oil recovery operations. Both the extent of clean-up based on residual oil left in the waste water and the efficiency of clean-up based on the treat rate of additive have been found to be significantly improved using the novel process of this invention. The novel process involves the use of a low level of a water dispersible terpolymer consisting of a water soluble nonionic monomer, such as acrylamide, a cationic monomer, such as 3-acrylamidopropyltrimethylammonium chloride, and a hydrophobic monomer, such as alkyl(meth)acrylamide or alkyl(meth)acrylate. These terpolymers are effective for the clean-up of waste water containing organic contaminants and for the breaking of oil-in-water produced emulsions.

DETAILED DESCRIPTION OF THE INVENTION

The present invention describes a novel process whereby water dispersible terpolymers are used for the removal of emulsified oil from water. The polymers used in this invention are more fully described in a copending application, U.S. Ser. No. 904,548 filed 9/8/86, which is herein incorporated by reference. The terpolymers consist of one or more nonionic, water soluble monomers, such as acrylamide; one or more water soluble cationic monomers, such as 3-acrylamidopropyltrimethylammonium chloride (MAPTAC), and one or more water insoluble or hydrophobic monomers, such as alkylacrylamide.

The water soluble cationic monomers of the terpolymer are selected from the group consisting of salts of ammonium alkyl(meth)acrylamides, ammonium alkyl(meth)acrylates or diallyl substituted ammonium salts. MAPTAC, 3-methacrylamidopropyltrimethylammonium chloride, or 3-methacrylamidopropyldimethylammonium hydrogen sulfate are typical examples of acrylamide-based cationic monomer. A representative acrylate monomer is METAC, 2-acrylatoethyltrimethylammonium chloride or METAMS, 2-acrylatoethyltrimethylammonium methyl sulfate. The other type of cationic monomer utilized in the present invention is exemplified by DMDAAC, diallyl dimethyl ammonium chloride.

The water insoluble or hydrophobic monomers of the water dispersible terpolymers used in the process of this invention are N-substituted (meth)acrylamides or (meth)acrylates. The substitution is an oil soluble hydrocarbon selected from the group of straight chained or branched alkyl, alkylcycloalkyl or alkylaryl groups wherein the alkyl group has from 4 to 24 carbon atoms, more preferably from 4 to 20 carbon atoms, and most preferably from 6 to 18 carbon atoms. Illustrative of these hydrophobic monomers are N-1-hexylacrylamide, N-1-octylacrylamide, N-1-decylacrylamide, N-1-dodecylacrylamide, N-1-t-octylacrylamide, N-octylacrylamide, N-t-octylacrylamide, N-decylacrylamide and mixtures thereof. Hydrophobic monomers resulting from the reaction of acrylonitrile and an olefin will generally consist of isomeric mixtures comprising different points of attachment of the nitrogen to the carbons along the alkyl chain. In addition, hydrophobic monomers of the acrylate type consist of hexyl(meth)acrylate, octyl(meth)acrylate, decyl(meth)acrylate, dodecyl(meth)acrylate, tetradecyl(meth)acrylate, hexadecyl(meth)acrylate, octadecyl(meth)acrylate, and mixtures thereof. The vinylic carbons may also be substituted with an oil soluble group to create hydrophobic monomers. These oil soluble alkyl groups can contain from 1 to 12 carbon atoms.

The terpolymers used in the process of the instant invention contain about 0 to about 98.9 mole percent of acrylamide monomer, more preferably about 10 to about 94.8, and most preferably about 25 to about 94.8; about 1 to about 99 mole percent of cationic monomer, preferably about 5 to about 80, and most preferably about 5 to about 70; and about 0.1 to about 20 mole percent of water insoluble, hydrophobic monomer, more preferably about 0.2 to about 10, and most preferably about 0.2 to about 5.

One of the ways of preparing the terpolymers used in this invention is by a novel micellar free radical terpolymerization process more completely described in copending application U.S. Ser. No. 904,461 filed Sept. 8, 1986, which is incorporated herein by reference. The process comprises the steps of forming a micellar surfactant solution of the oil soluble or hydrophobic monomer in an aqueous solution of acrylamide and cationic monomer; deaerating this solution by purging with nitrogen or additionally applying a vacuum; raising the temperature to the desired reaction temperature; adding sufficient free radical initiator to the reaction solution; and polymerizing for a sufficient period of time at a sufficient temperature to effect polymerization. Other polymerization processes could be considered for preparing the terpolymers used in the process of this invention. For example, inverse emulsion techniques, such as described by Vanderoff, et al., U.S. Pat. No. 3,284,393, and the use of water miscible cosolvents, such as alcohols, esters, ethers and ketones, could be used. More critical to this invention are the hydrophobic cationic terpolymer compositions as herein described rather than their method of preparation. The composition described hereinafter refers to monomer feed levels.

Any of a variety of free radical initiators, such as sodium, ammonium or potassium persulfate, either alone or with a suitable reductant, such as sodium meta bisulfite, can be used to initiate polymerization. Other free radical initiators known in the art, such as AIBN and azo compounds, can be used. In general, the reaction temperature is selected to enable sufficient radicals to be generated by the chosen initiator. Temperatures from 20° C. to 90° C. can be used, more preferably 25° C. to 80° C., and most preferably 25° C. to 70° C.

The resulting terpolymer or acrylamide, cationic monomer and a hydrophobic N-alkylacrylamide or alkyl(meth)acrylate can be isolated from the reaction mixture by any of a variety of techniques which are well known to one skilled in the art. For example, the polymer may be recovered by precipitation using a non-solvent, such as acetone, methanol, isopropanol or mixtures thereof. The precipitated polymer can then be washed and oven dried to provide a product in the form of a free flowing powder. Alternatively, the polymer solution or cement may be used as is by diluting with the desired aqueous solvent to the concentration of use.

The surfactants which may be used in this process may be one of the water soluble surfactants selected from the group consisting of alkyl trimethyl ammonium halides, as chlorides or bromides. Preferred are decyl trimethyl ammonium chloride, dodecyl trimethyl ammonium chloride and tetradecyl trimethyl ammonium chloride. For these ionic surfactants the Krafft point, which is defined as the minimum temperature for micelle formation, must be below the temperature used for the polymerization. Thus, at the conditions of polymerization the desired surfactant will form micelles which solubilize the water insoluble monomer. Nonionic surfactants can also be used for preparing the polymers of this invention. For example, ethoxylated alcohols, ethoxylated alkyl phenols, ethoxylated dialkyl phenols, ethylene oxide-propylene oxide copolymers and polyoxyethylene alkyl ethers and esters can be used. Preferred nonionic surfactants are ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule.

The advantage of the polymers disclosed here over polymers currently used is the discovery that the presence of a hydrophobic group on the water dispersible polymer during a water treating operation results in a significant improvement in the performance, the breaking of reverse emulsions and the removal of emulsified or dispersed oil from waste waters. By way of example, oil droplets emulsified in water generally carry a negative surface charge or zeta potential which helps to stabilize the emulsion, keeping the droplets dispersed and making them difficult to resolve or break. Cationic polymers or surfactants are used to neutralize the surface charge. Once the charge is near neutrality the droplets may begin to approach each other and agglomerate or coalesce since the electrostatic repulsion responsible for a significant portion of the emulsions's stability has been eliminated. Eventually, large floc formation or liquid oil formation occurs. Once the droplets begin to flocculate they can begin to float since they are much larger than the starting oil droplets. As they grow in size they will rise to the surface of the water at a faster rate. If high molecular weight cationic polymer is used for charge neutralization the polymer will accelerate the separation of the oil since the polymer is attracted to the oil droplet by coulombic attraction, hydrogen bonding and other undefined or not clearly understood mechanisms. In some cases low molecular weight cationic chemicals are added for charge control and then high molecular weight nonionic or anionic polymers are added next to cause polymer bridging between droplets and accelerate floc formation.

The advantage of the disclosed terpolymers is related to the fact that they are water dispersible but also contain small amounts of hydrophobic groups. Not wishing to be bound by theory, we believe that while conventional polymers can attach themselves to oil droplets by coulombic attraction, hydrogen bonding and other undefined or not clearly understood mechanisms, the hydrophobic groups of these novel terpolymers can also be attached by a hydrophobic group-hydrophobic oil droplet association. Additionally, it may be possible that hydrophobic groups on different polymer molecules interact to form a bridge or network which may aid in floc formation and oil flotation. While coulombic attraction still appears to be the strongest type of attraction, the hydrophobic association, or hydrophobic effect, appears to add significant strengthening to this attraction, as evidenced by improved emulsion breaking and waste water clean-up. Indications are that the cationic hydrophobic polymers of this invention enable the formation of very strong floc particles. This is based on the observation that, unlike many conventional treatments, the floc particles produced by the water treatment process of this invention are very difficult to redisperse with agitation once they are formed. Adsorption of the hydrophobic functionalized water dispersible polymer on the surface of the oil droplets is believed to be the cause of this observation.

The process for the removal of the emulsified oil from the water comprises adding under suitable agitation conditions about 0.1 to about 200 ppm of the hydrophobically functionalized water dispersible cationic polymer to the waste water containing the emulsified oil droplets. After contacting under suitable agitation conditions for a prescribed time period the emulsified oil droplets and polymer separate under quiescent conditions into a distinct layer from the water. The disclosed terpolymers are added to the mixture of water and emulsified oil droplets at a concentration of about 0.1 to about 200 ppm, depending on the amount of oil present and several other factors. The rate of mixing after polymer addition varies, depending on the type of water being treated, the amount of oil emulsified in the water, temperature and several other conditions not generally under the control of the person applying the treatment. The concentration of oil remaining in the water after treatment with the disclosed polymers is significantly less than the concentration of oil remaining in the water after similar treatment with a similar polymer not containing the novel hydrophobe functionalization. The oil layer which has separated as a distinct layer from the layer of water can be separated from the water by conventional methods.

This disclosure describes a process to break oily water emulsions and oil field produced fluids, commonly referred to as reverse emulsions. While it is difficult to exactly simulate these emulsions in the laboratory, it is common practice to make laboratory emulsions using crude oil from an oil production field of interest by high shear mixing the given crude into water using a Waring blender or homogenizer. The then-formed oil-in-water emulsion can then be diluted with water and other suitable materials to simulate the oil production field being studied. The emulsions thus produced simulate oily waste waters from a given area but are recognized as being an approximation. One would typically use these laboratory emulsions for testing chemical additives in the laboratory prior to confirmatory testing on the actual system in the field. While this method appears suitable for the testing of oily waste waters, the testing of chemical additives as oil field produced fluid reverse emulsion breakers in the laboratory is next to impossible and generally requires that such test work be carried out in the field since the very concentrated oil-in-water emulsions prepared in the laboratory are not stable and do not suitably simulate wellhead produced fluids.

A common laboratory test to simulate a mild water clarification process in the field is what is referred to as the Jar Test. The Jar Test involves putting 500 ml of a laboratory prepared or actual field emulsion into 600 ml clear glass beakers (six at a time). Large beakers may be used if enough fluid is available. The beakers are then placed on a six paddle Phipps & Bird stirrer and mixed at a high rate, referred to as the fast mix period. Polymer is added at this mixing speed and timing is begun. After a specified amount of time at high speed the mixing rate is reduced to a much slower rate for another specified amount of time. The beakers are removed from the mixer and allowed to stand for another period of time. Samples of solution are removed from a point near the 250 ml mark on the beakers and tested for turbidity (NTU), using standard test equipment, and oil-in-water content, using one of several available methods. An example of one of the oil-in-water determinations is to Freon or carbon tetrachloride extract the oil from a waste water and then measure its infrared adsorbance relative to a standard. The object of the test is to achieve the lowest NTU or oil level using the smallest amount of polymer. The actual mixing rates and times used in the Jar Test depend on the system being simulated and vary from study to study. The Jar Test, from the experience of many investigators over the years, has been shown to provide a good simulation of field clarification systems.

Another laboratory test commonly used in the current art is the Wemco 1+1 Laboratory Flotation Machine, available from Wemco of Sacramento, Calif. The technique used by the Wemco machine is also commonly referred to as induced air flotation. The Wemco 1+1 Laboratory Flotation machine is a small scale pilot unit designed to model the full scale units built by Wemco which are commonly used in the oil fields and in several other industries for water clarification and oil and solids removal. The laboratory Wemco, from the experience of several investigators over the years, has been found to provide a good simulation of what will occur in the larger unit when it is used in the evaluation of chemical additives. Laboratory prepared or actual field waste waters or emulsions are added to the test bowl of the Wemco and mixed for a few seconds with chemical additives without aeration. The air is then turned on and oil floatation occurs. Samples of the Wemco-treated water are then withdrawn from a point near the bottom of the bowl for turbidity and oil-in-water determinations, as described above.

DESCRIPTION OF THE PREFERRED EMBODIMENTS

The following Examples illustrate the present invention without, however, limiting the same hereto.

EXAMPLE 1

Micellar Terpolymerization with Cationic Monomers

A solution of 15 g of Arquad ® (trimethyldodecyl ammonium chloride, Armak Chemical Company) in 500 ml of deoxygenated water was prepared. N-octylacrylamide, 0.4034 g, was dissolved in this solution, followed by 12.37 g of acrylamide and 9.73 g of MAPTAC. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of 0.117 g of $K_2S_2O_8$, followed by 0.0077 g of $Na_2S_2O_5$. After stirring for 16 hours at 25°±0.2° C. the viscous solution could be used as in cement form or in the polymer isolated by pouring slowly into 3 L of acetone. The precipitated polymer was then masticated in a Waring blender with additional acetone, filtered and dried under vacuum at 30° C. The yield of polymer was 19.7 g (87.6%). A variety of terpolymers were prepared using similar techniques with differing types and amounts of hydrophobic N-alkylacrylamides and alkyl acrylates and water soluble cationic monomers, such as ammoniumalkyl acrylamides, ammoniumalkyl acrylates and diallyl ammonium salts.

EXAMPLE 2

Cody crude oil (10 g), with the free water removed, was emulsified into 495 g of distilled water containing 100 ppm of an anionic surfactant using a Waring blender or a homogenizer. The concentrated emulsion was permitted to sit overnight (approximately 18 hours) in a separatory funnel and then the bottom layer was diluted (25 g of emulsion per liter of distilled water) and salinity adjusted to 600 ppm of NaCl. This resulted in a test emulsion with the following typical properties:

Turbidity: 270 to 280 NTU
Oil Content: 420 to 450 mg/l
pH: 8.0 (adjusted).

Usually a large volume of this emulsion (15 L) is prepared and any unused is discarded at the end of the day. The emulsion concentrate can be prepared several days ahead of time as long as it is removed from the separatory funnel after the prescribed aging time.

EXAMPLE 3

Synthetic Emulsion Preparation

Bakersfield crude oil (10 g), with the free water removed, was emulsified into 495 g of distilled water using a homogenizer. The concentrated emulsion was permitted to sit overnight (approximately 18 hours) in a separatory funnel and then the bottom layer was diluted (25 g of emulsion per liter of distilled water) and salinity adjusted to 600 ppm of NaCl. This resulted in a test emulsion with the following typical properties:

Turbidity: 160 to 190 NTU
Oil Content: 160 to 190 mg/l
pH: 8.0 (adjusted).

Usually a large volume of this emulsion (15 L) is prepared and any unused is discarded at the end of the day. The emulsion concentrate can be prepared several days ahead of time as long as it is removed from the separatory funnel after the prescribed aging time.

EXAMPLE 4

Oily Water Treating with Conventional Polymers

The test emulsion prepared in Example 2 is separated into 500 ml samples, as needed, in 600 ml clear glass beakers (six at a time) and placed on a six paddle Phipps & Bird stirrer and mixed at approximately 150 to 160 rpm. Polymer is added at this mixing speed and timing is begun. After 30 minutes at high speed the mixing rate is reduced to 10 rpm for 15 minutes and then the beakers are removed from the mixer and allowed to stand for 60 minutes. Samples of solution are removed from a point near the 250 ml mark on the beakers and tested for turbidity (NTU) and oil-in-water content. The object of the test is to achieve the lowest NTU or oil level using the smallest amount of polymer.

A typical set of test results, which demonstrates the performance of conventional water soluble polymers using a laboratory simulated waste water emulsion Jar Test, are shown below.

| | Starting Oil Level = 465 ppm, 275 NTU | | |
|---|---|---|---|
| | | After Treatment | |
| Polymer | ppm Active Polymer | Turbidity NTU | Oil ppm |
| A | 0.25 | 260 | 464 |
| | 0.38 | 115 | 430 |
| | 0.5 | 180 | 450 |
| | 0.75 | 240 | 445 |
| | 1.0 | 260 | 462 |
| B | 0.3 | 275 | 249 |
| | 0.6 | 140 | 167 |
| | 0.9 | 32 | 273 |
| | 1.2 | 50 | 375 |
| | 1.5 | 80 | 415 |
| | 1.8 | 100 | 421 |

POLYMERS:
A - epipolyamine adduct of epichlorohydrin and dimethylamine
B - 59 Wt. % Cationic Acrylamide The data indicate that the conventional polymers did not remove too much of the oil, but had a larger effect on turbidity reduction. Oil removal, however, is the critical parameter.

EXAMPLE 5

Oily Water Treatment with Hydrophobic Functionalized Polymers

A test similar to Example 4 was run using two polymers made by the process in Example 1 of this invention. One polymer (A) was made with 5% cationic MAPTAC monomer, 1% n-octylacrylamide (n-$C_8$AM) hydrophobic monomer, the remainder being acrylamide, while the other polymer (B) was made under identical conditions but with no hydrophobic monomer added. The B polymer is similar to commercial polymers. A typical set of test results, which demonstrates the benefits of hydrophobic functionalization of water soluble polymers taught in this invention using a laboratory simulated waste water emulsion Jar Test are shown below:

| ppm Oil Remaining After Treatment With Polymer (starting oil = 505 ppm) | | | | | | | | | | |
|---|---|---|---|---|---|---|---|---|---|---|
| | ppm Polymer | | | | | | | | | |
| | 1.0 | 2.0 | 3.0 | 3.5 | 4.0 | 4.5 | 5.0 | 5.5 | 6.0 | 7.0 |
| Polymer A | 461 | 459 | 152 | 95 | 25 | 13 | 5.6 | 4.6 | 6.1 | 9.3 |
| Polymer B | 483 | 455 | 417 | | 28 | | 20 | | 36 | 60 |

The difference in A and B polymer performance is due to the presence of hydrophobic groups in the water dispersible polymer. The hydrophobe containing polymer A of this invention produces the cleaner water and is not as susceptible to over treating as the conventional polymer B.

EXAMPLE 6

Effect of Hydrophobe Level on Oily Water Treatment

The test method described in Example 4 was used to test a series of polymers on an emulsion prepared according to the method in Example 2 using a Hawkins crude oil. The polymers tested were all synthesized with 20 mole percent cationic MAPTAC monomers, various levels of n-$C_8$AM hydrophobic monomer (see table below), the remainder being acrylamide. The performance data, summarized below, in combination with the data in Example 5, clearly show the advantage of this invention, the use of hydrophobic functionalization on water dispersible polymers, that an increase in the amount of hydrophobe functionalization improves performance for this crude, and that this invention is useful on more than one crude.

| ppm Oil Remaining After Treatment With Polymer (starting oil = 269 ppm) | | | | | | |
|---|---|---|---|---|---|---|
| Polymer | Hydrophobe | 1.0 | 1.5 | 2.0 | 2.5 | 3.0 |
| A | None | 241 | 58 | 112 | 245 | 265 |
| B | 1.0% n-$C_8$ | 236 | 10 | 54 | 48 | 7 |
| C | 1.5% n-$C_8$ | 55 | 37 | 6 | 25 | |

EXAMPLE 7

Effects of Hydrophobic Type and Level on Oily Water Treatment

The test method described in Example 4 was used to test a series of polymers on an emulsion prepared according to the method in Example 2. The polymers tested in cement form were all synthesized with 10 mole percent cationic MAPTAC monomer, various levels and types of $C_8$AM hydrophobic monomer (see table below), the remainder being acrylamide. The polymers tested were in the cement form. The cement that are referred to in this invention are the various solutions formed during polymerization which contain polymer, surfactant and any unreacted components. No purification is used prior to use of a cement. The performance data are shown in the table below.

| ppm Oil Remaining After Treatment with Polymer (starting oil = 480 ppm) | | | | | | | |
|---|---|---|---|---|---|---|---|
| | | ppm active polymer | | | | | |
| Polymer | Hydrophobe | .5 | .75 | 1.0 | 1.25 | 1.5 | 2.0 |
| A | 1.0% n-$C_8$ | 245 | 38 | 25 | 22 | 272 | 438 |
| B | 1.0% t-$C_8$ | 381 | | 51 | 29 | 420 | 455 |
| C | 1.5% t-$C_8$ | 422 | | 67 | 58 | 304 | 441 |

The data indicate that n-$C_8$ hydrophobe is better than t-$C_8$ at both molar levels tested on the Cody emulsion using the Jar Test.

EXAMPLE 8

Effects of Hydrophobe Type and Level on Wemco Oily Water Test

An induced air flotation test was used in the laboratory to simulate field induced air flotation units. A Wemco 1+1 Laboratory Flotation Machine, available from Wemco in Sacramento, Calif. was used. Three liters of emulsion prepared in Example 2 were placed in the Wemco vessel. The mixer was turned on and maintained at 1,000 rpm and test polymer was added and mixed in for 30 seconds. The air was then turned full on while mixing continued for 120 seconds. At this time froth forms and oil floats to the surface if an effective polymer or additive is present. The unit was turned off after the 120 second aeration and the water was permitted to sit without movement for 30 seconds. Samples for turbidity and oil analysis were withdrawn by pipet from a fixed point near the bottom of the vessel after the 30 second wait. The polymers tested in cement form were all synthesized with 10 mole percent cationic MAPTAC monomer, various levels and types of $C_8AM$ hydrophobic monomer (see table below), the remainder being acrylamide. The performances are shown in the table below.

| ppm Oil Remaining After Treatment With Polymer (starting oil = 499 ppm) | | | | | |
|---|---|---|---|---|---|
| | | ppm Active Polymer | | | |
| Polymer | Hydrophobe | 1.0 | 1.5 | 1.75 | 2.0 | 2.5 |
| A | 1.0% n-$C_8$ | 132 | 41 | 52 | 70 | |
| B | 1.0% t-$C_8$ | 242 | 73 | 115 | 156 | |
| C | 1.5% t-$C_8$ | 364 | 51 | | 44 | 77 |

The data indicate that n-$C_8$ is better than t-$C_8$ at equal molar hydrophobe and that more t-$C_8$ is better under flotation test conditions.

EXAMPLE 9

Effect of Wemco Mixing Time

A test was performed to determine the effect of Wemco mixing time on the performance of the hydrophobically functionalized polymers. The test method described in Example 8 was used to test a series of polymers on an emulsion prepared according to the method in Example 3. A treatment rate of 1.0 ppm active polymer was used in all of the testing. The only variable was the polymer type and the amount of aeration in the test. The polymers tested were in the cement form and both were made with 10% MAPTAC, with and without t-$C_8AM$ hydrophobic monomer, the remainder being acrylamide. The performance data below clearly show the benefits of hydrophobic group addition to cationic acrylamide copolymers.

| ppm Oil Remaining After Treatment with Polymer (starting oil = 183 ppm) | | | | | |
|---|---|---|---|---|---|
| | | Seconds of Aeration | | | |
| Polymer | Hydrophobe | 30 | 60 | 90 | 180 |
| A | None | 56 | 31 | 24 | 15 |
| B | 2.0% t-$C_8$ | 39 | 16 | 10 | 4 |

EXAMPLE 10

A Wemco test was performed on a series of polymers using an emulsion prepared according to Example 2 and the test method on Example 8. The polymers tested were all synthesized with 20 mole percent cationic MAPTAC monomer, various levels and types of hydrophobic acrylamide monomer (see table below), the remainder being acrylamide. The performance data are summarized below

| ppm Oil Remaining After Treatment With Polymer (starting oil = 483 ppm) | | | | | | |
|---|---|---|---|---|---|---|
| | | ppm Active Polymer | | | | |
| Polymer | Hydrophobe | 1.0 | 1.5 | 2.0 | 2.5 | 3.0 |
| A | None | 258 | 119 | 103 | 228 | |
| B | 1.0% n-$C_8$ | | 104 | 82 | 199 | |
| C | 1.5% n-$C_8$ | 197 | 134 | 91 | 63 | 122 |
| D | 1.0% t-$C_8$ | | 118 | 106 | 184 | |
| E | 1.0% n-$C_{12}$ | | 146 | 116 | 191 | |

The data indicate that at a high cationic charge density, 20 mole percent, there once again is a benefit to having hydrophobe on the water soluble polymer backbone and that normal octyl is the most efficient under the conditions of this Example.

EXAMPLE 11

Wemco Oily Water Test

A Wemco test was performed on a series of polymers using a Bakersfield emulsion prepared according to Example 3 and the test method in Example 8. The polymers tested in the cement form were all synthesized with 10 mole percent cationic MAPTAC monomer, various levels of t-$C_8AM$ hydrophobic monomer (see table below), the remainder being acrylamide. The performance data are shown in the table below.

| ppm Oil Remaining After Treatment With Polymer (starting oil = 197 ppm) | | | | | |
|---|---|---|---|---|---|
| | | ppm Active Polymer | | | |
| Polymer | Hydrophobe | .25 | .5 | 1.0 | 1.5 | 2.0 |
| A | None | | 139 | 19 | 30 | 48 |
| B | 1.0% t-$C_8$ | 168 | 16 | 10 | 19 | |
| C | 1.5% t-$C_8$ | 150 | 9 | 8 | 14 | |

The data indicate that t-$C_8$ hydrophobe can be effective compared to currently available copolymers. In comparison with the emulsion of Example 8 this system is more effective in clarifying Bakersfield emulsion. Thus, the importance of testing a polymer system against several different types of oily water emulsions is indicated.

EXAMPLE 12

Wemco Oily Water Test

A Wemco test was performed on a series of polymers using an emulsion prepared according to Example 3 and the test method in Example 8. The polymers tested were in cement form and were all synthesized with 10 mole percent cationic MAPTAC monomer, various levels of t-$C_8AM$ hydrophobic monomer (see table below), the remainder being acrylamide. The performance data are shown in the table below.

| ppm Oil Remaining After Treatment With Polymer (starting oil = 174 ppm) | | | | | | |
|---|---|---|---|---|---|---|
| | | ppm Active Polymer | | | | |
| Polymer | Hydrophobe | .5 | 1.0 | 1.5 | 20 | 3.0 |
| A | 3.0% t-$C_8$ | 18 | 7 | 7 | 11 | 17 |
| B | 4.0% t-$C_8$ | 15 | 4 | 5 | 6 | |
| C | 5.0% t-$C_8$ | 20 | 17 | 8 | 19 | |

The data indicate that increasing t-$C_8$ hydrophobe level can result in improved performance and that there may be an upper limit to useful hydrophobe content.

EXAMPLE 13

Wemco Oily Water Tests with DMDAAC Cationic Polymers

A Wemco test was performed on a series of polymers using an emulsion prepared according to Example 3 and the test method in Example 8. The polymers tested were all synthesized with 20 mole percent cationic DMDAAC monomer, various levels of N-$C_8$AM hydrophobic monomer (see table below), the remainder being acrylamide. The performance data are shown in the table below.

| ppm Oil Remaining After Treatment With Polymer (starting oil = 168 ppm) | | | | | |
|---|---|---|---|---|---|
| | | ppm Active Polymer | | | |
| Polymer | Hydrophobe | 0.5 | 1.0 | 1.5 | 2.0 | 3.0 |
| A | None | 161 | 155 | 152 | 159 | |
| B | 1.0% n-$C_8$ | 109 | 99 | 106 | 104 | 103 |
| C | 1.5% n-$C_8$ | 155 | 117 | 93 | 84 | 58 |

The data show that the DMDAAC cationic monomer may be used in this invention.

EXAMPLE 14

Wemco Oily Water Tests with METAC Cationic and LMA Polymers

A Wemco test was performed on a series of polymers using an emulsion prepared according to Example 2 and the test method in Example 8. The polymers tested were synthesized using 10 mole percent METAC, with and without lauryl methacrylate (LMA) hydrophobic monomer (see table below), the remainder being acrylamide. The performance data are summarized below.

| ppm Oil Remaining After Treatment With Polymer (starting oil = 482 ppm | | | | | | | |
|---|---|---|---|---|---|---|---|
| | | ppm Active Polymer | | | | | |
| Polymer | Hydrophobe | 1.0 | 1.5 | 2.0 | 2.5 | 3.0 | 4.0 | 5.0 |
| A | None | 447 | 450 | 365 | | 292 | 316 | 333 |
| B | 1.0% LMA | | 242 | 232 | 193 | 179 | 170 | 173 |

The data demonstrate that METAC cationic monomer and alkyl methacrylates may be used in this invention.

EXAMPLE 15

Effect of Cationic and Hydrophobic Monomer Type on Oily Water Wemco Performance

A test similar to Example 4 was run using polymers made by the process in Example 1 of this patent application. The polymers tested were synthesized using 10 mole percent of either MAPTAC or METAC cationic monomer, with or without 1 mole percent of either n-$C_8$AM or LMC hydrophobic monomer, the remainder being acrylamide. The chemistry and the Wemco performance data are summarized below.

| ppm Oil Remaining After Treatment With Polymer (starting oil = 482 ppm) | | | | | | | | | |
|---|---|---|---|---|---|---|---|---|---|
| | | Hydro- | ppm Active Polymer | | | | | | |
| Polymer | Cation | phobe | 0.5 | 1.0 | 1.5 | 2.0 | 2.5 | 3.0 | 4.0 | 5.0 |
| A | METAC | None | | 429 | 335 | 404 | 414 | 436 | 425 | 432 |
| B | METAC | LMA | | | 158 | 132 | 150 | 187 | 315 | |
| C | METAC | n-$C_8$ | | | 146 | 86 | 51 | 41 | 47 | 65 |
| D | MAPTAC | LMA | | | | 403 | | 239 | 134 | 68 |

The data confirm the benefits of hydrophobic functionalization using two types of cationic monomers and both acrylamide and acrylate linked hydrophobes.

EXAMPLE 16

Wemco Oily Water Field Test

A Wemco water clarification test was performed in an oil production field essentially using the method of Example 8. The purpose of this test was to evaluate the effects of the disclosed polymers on live production fluids. The field in which the test was performed produces about 100,000 barrels per day of a heavy oil and about 350,000 barrels per day of water by a steam flood method. The fluid is produced as an emulsion which is broken using conventional techniques. The water resulting from the resolution of the produced emulsion contains varying levels of residual oil and is sent to induced air flotation equipment where conventional polymers are used as flotation aids for oil removal. The water is further polished and is then used as supply water from steam generators. Feed water to the induced air flotation units was collected at a point in the line where it was free of flotation aid additive. The method described in Example 8 was then used on the fresh sample with some modifications. The chemical was mixed in for 15 seconds, rather than 30 seconds. A 60 second aeration time was used.

The water produced had a total dissolved solids of 10,000 mg/l, a pH of about 8.1 and was at about 170° F. The polymers tested in the cement form were all synthesized with 10 mole percent cationic MAPTAC monomer, with and without 2% t-$C_8$AM hydrophobic monomer (see table below), the remainder being acrylamide. The performance data are shown in the table below.

| % Oil Removal After Treatment With Polymer (starting oil = 52 ppm) | | | | | | |
|---|---|---|---|---|---|---|
| | | ppm Active Polymer | | | | |
| Polymer | Hydrophobe | 0.0 | .25 | .5 | 1.0 | 2.0 |
| A | None | 23 | 9 | 26 | 28 | 17 |
| B | 2.0% t-$C_8$ | 42 | 56 | 56 | 53 | |

-continued

% Oil Removal After Treatment With Polymer
(starting oil = 52 ppm)

| Polymer | Hydrophobe | ppm Active Polymer | | | |
|---|---|---|---|---|---|
| | | 0.0 | .25 | .5 | 1.0 | 2.0 |
| C | 2.0% t-C$_8$ | 48 | 56 | | | |

The data show that hydrophobic functionalized polymers (B and C) perform better than conventional polymers (A) in the field on fresh fluids. B and C polymers are replicate synthesis runs. The data also indicate the performance reproducibility of two batches of polymer made by the process described in this invention.

EXAMPLE 17

Wemco Oily Water Field Test

A series of polymers were tested using the method and location described in Example 16. The polymers tested in the cement form were all synthesized with 10 mole percent cationic MAPTAC monomer, 2 mole percent t-C$_8$AM hydrophobic monomer, the remainder being acrylamide. Molecular weight was the key variable and was estimated by solution viscosity and preparation conditions. The performance data are shown in the table below.

% Oil Removal After Treatment With Polymer
(starting oil = 52 ppm)

| Polymer | Molecular Weight | ppm Active Polymer | | | | |
|---|---|---|---|---|---|---|
| | | 0.0 | .25 | .5 | 1.0 | 2.0 |
| A | Low | 12 | 38 | 50 | | |
| B | Medium | | 35 | 59 | 59 | 43 |
| C | High | | 31 | 54 | 57 | 62 |
| D | Current product & treatment level | | | | | 52 |

The data indicate that good water clarification performance can be achieved with hydrophobically functionalized polymers over a wide range of molecular weight and that good performance can be achieved in the field and the laboratory.

EXAMPLE 18

Wemco Oily Water Field Test

A series of polymers were tested using the method described in Example 16 at a different steam flood location producing oil from a very different area. The Wemco was run at 1,000 rpm. Additive was mixed without air for 15 seconds, a 45 second aeration time was used, and the sample for analysis was removed from the bottom of the vessel with the air still on at the end of the aeration time. The polymers tested were all synthesized with 10 mole percent cationic MAPTAC monomer, with or without n-C$_8$AM hydrophobic monomer, the remainder being acrylamide. The data are summarized in the table below.

% Oil Removal After Treatment With Polymer
(starting oil = 130 to 190 ppm)
(oil removal range without chemical = 53 to 68%)

| Polymer | Hydrophobe | ppm Active Polymer | | | | |
|---|---|---|---|---|---|---|
| | | 0.4 | .75 | 1.5 | 3.0 | 4.5 |
| A | None | | 64 | 58 | | |
| B | 1.5% n-C$_8$ | 77 | 81 | 84 | 83 | |
| Current Commercial | | | | 75 | 79 | 72 |

-continued

% Oil Removal After Treatment With Polymer
(starting oil = 130 to 190 ppm)
(oil removal range without chemical = 53 to 68%)

| Polymer | Hydrophobe | ppm Active Polymer | | | | |
|---|---|---|---|---|---|---|
| | | 0.4 | .75 | 1.5 | 3.0 | 4.5 |
| Chemical Used | | | | | | |

The data indicate that the polymers of this invention perform better than conventional polymer without hydrophobic functionalization under field conditions and that the performance advantage of this invention is not limited to one field.

EXAMPLE 19

Wemco Oily Water Field Test

A series of polymers were tested using the method described in Example 16 at a different steam flood location producing oil from a very different area. The method was the same, only the sample for analysis was taken from the Wemco while the vessel was draining, immediately at the end of the test. The polymers tested were all synthesized with 10 mole percent cationic MAPTAC monomer, with or without n-C$_8$AM hydrophobic monomer, the remainder being acrylamide. Polymers A, B and C were synthesized according to the method described in Example 1 using the referenced surfactant. Polymer D was synthesized using the same method but with an ethoxylated nonyl phenol surfactant in place of the previous one. The data are summarized in the table below.

% Oil Removal After Treatment With Polymer
(starting oil = 142 ppm)
(oil removal without chemical = −2%)

| Polymer | Hydrophobe | ppm Active Polymer | | | | | |
|---|---|---|---|---|---|---|---|
| | | .25 | .375 | .5 | .75 | 1.0 | 1.25 |
| A | None | | | 21 | | 33 | |
| B | 1.0% n-C$_8$ | | | 42 | 40 | 66 | 63 |
| C | 1.5% n-C$_8$ | 40 | | 70 | 73 | | |
| D | 1.0% n-C$_8$ | 50 | 66 | 70 | 77 | 76 | |

NOTE: D is the same as B only a different surfactant was used in the polymer synthesis.

The data clearly show the benefit of hydrophobe and improved performance with the ethoxylated nonionic surfactant of polymer D relative to polymer B.

EXAMPLE 20

Reverse Demulsification Field Test

Tests were performed on wellhead fluids in a steam flood field where a water continuous emulsion estimated to contain 10% to 15% of a heavy oil emulsified in it is produced. About 100 ml of fresh produced emulsion was placed in a six ounce bottle. Chemical additives were then added and the bottles were then gently shaken 100 times and allowed to stand for observation. Generally this test was performed in sets such that a complete series of treatment levels of a given chemical were all run at the same time. After initial observation the bottles were shaken vigorously 100 times and allowed to stand once again. Subjective judgments were recorded regarding the water quality produced and the stability of the oil-water interface that resulted. The polymers tested were all synthesized with various levels of MAPTAC cationic monomer, with or without n-

C8AM hydrophobic monomer, the remainder being acrylamide. The polymers are further defined along with the performance data in subjective rank order.

| RANK | HYDRO-PHOBE | % MAPTAC | ppm ACTIVE RANGE | REMARK |
|---|---|---|---|---|
| | | EXCELLENT | | |
| 1 | 1.0% n-C8 | 10 | 4–8 | Good interface, wide treating range, highest molecular weight. |
| | | VERY GOOD | | |
| 2 | 1.0% n-C8 | 10 | 3–6 | Loose interface. |
| 2 | 1.5% n-C8 | 10 | 4 | Loose interface. |
| 3 | 1.0% n-C8 | 10 | 3–6 | Loose interface. |
| | | GOOD | | |
| 4 | 1.5% n-C8 | 20 | 4–5 | Loose interface. |
| | None | 10 | 2–6 | Loose interface. |

The Examples presented clearly indicate the advantage of the process disclosed in this invention. The presence of a hydrophobic group on the water dispersible polymer during a water treatment or an oil-in-water emulsion breaking operation clearly results in a significant improvement in the performance, the breaking of reverse emulsions and the removal of emulsified or dispersed oil from the waste waters.

What is claimed is:

1. A method of breaking an oil-in-water emulsion which comprises the steps of treating said oil-in-water emulsion with at least a de-emulsifying amount of a water dispersible terpolymer comprising an acrylamide monomer, a water soluble cationic monomer and a water insoluble, hydrophobic monomer, and separating the formed water phase from the formed oil phase, wherein said terpolymer contains about 10 mole % 98.9 mole percent of said acrylamide monomer, about 1 to abut 99 mole percent of cationic monomer, and about 0.1 to about 10 mole percent of said water insoluble, hydrophobic monomer, wherein said cationic monomer is selected from the group consisting of salts of ammoniumalkyl(meth)acrylamide, ammonium alkyl(meth)acrylate and diallyl substituted ammonium salt, wherein said water insoluble, hydrophobic monomer is selected from the group consisting of N-alkyl(meth)acrylamide, wherein the alkyl group is a straight, branched or an alkyl cyclic chain having about 6 to about 22 carbon atoms and an alkyl(meth)acrylate, wherein the alkyl group is a straight, branched or an alkyl cyclic chain having about 6 to about 22 carbon atoms.

2. A method according to claim 1 wherein said terpolymer is added to said oil-in-water emulsion at a concentration of about 0.1 to about 200 ppm.

3. A method according to claim 1 wherein said cationic monomer is selected from the group consisting of 3-methacrylamidopropyltrimethylammonium, 2-methacrylatoethyltrimethylammonium and diallyl dimethylammonium chloride or methyl sulfate salts.

4. A method according to claim 1 or 3 wherein said water insoluble, hydrophobic monomer is selected from the group consisting of an N-hexyl, octyl, decyl or dodecyl acrylamide or mixtures thereof.

5. A method according to claim 1 wherein said water insoluble, hydrophobic monomer is an alkyl(meth)acrylate with the alkyl group containing 6 to 18 carbon atoms.

* * * * *